(12) United States Patent
Goldberg et al.

(10) Patent No.: US 10,382,624 B2
(45) Date of Patent: Aug. 13, 2019

(54) BRIDGE FOR NON-VOICE COMMUNICATIONS USER INTERFACE TO VOICE-ENABLED INTERACTIVE VOICE RESPONSE SYSTEM

(71) Applicant: Speech-Soft Solutions LLC, Edmond, OK (US)

(72) Inventors: Randy G. Goldberg, Holmdel, NJ (US); Deborah W. Brown, Alpharetta, GA (US); Janardhan P. Reddy, Allen, TX (US)

(73) Assignee: Speech-Soft Solutions Inc., Oklahoma City, OK (US)

( * ) Notice: Subject to any disclaimer, the term of this patent is extended or adjusted under 35 U.S.C. 154(b) by 75 days.

(21) Appl. No.: 15/446,646

(22) Filed: Mar. 1, 2017

(65) Prior Publication Data

US 2018/0255180 A1 Sep. 6, 2018

(51) Int. Cl.
| | |
|---|---|
| *H04M 11/00* | (2006.01) |
| *H04M 3/493* | (2006.01) |
| *H04L 12/58* | (2006.01) |
| *G06F 3/16* | (2006.01) |
| *G06F 17/27* | (2006.01) |
| *G10L 15/19* | (2013.01) |

(52) U.S. Cl.
CPC .......... *H04M 3/4938* (2013.01); *G06F 3/167* (2013.01); *G06F 17/2765* (2013.01); *H04L 51/02* (2013.01); *G10L 15/19* (2013.01); *H04M 2201/405* (2013.01); *H04M 2203/254* (2013.01)

(58) Field of Classification Search
CPC ... H04M 2203/2061; H04M 2203/254; H04M 2203/558; H04M 3/42068; H04M 3/493
USPC ............................................ 379/88.01–88.19
See application file for complete search history.

(56) References Cited

U.S. PATENT DOCUMENTS

| | | | |
|---|---|---|---|
| 6,920,425 B1* | 7/2005 | Will ...................... | H04M 3/493 |
| | | | 379/88.13 |
| 8,204,184 B2* | 6/2012 | Gao ........................ | G06F 3/016 |
| | | | 379/265.01 |
| 9,124,695 B1* | 9/2015 | George ................ | G06F 3/04842 |
| 9,318,108 B2 | 4/2016 | Gruber et al. | |
| 9,495,331 B2 | 11/2016 | Govrin et al. | |
| 2007/0033038 A1 | 2/2007 | Strong | |

(Continued)

OTHER PUBLICATIONS

Capterra; "Five9: Who uses this software?", retrieved on Jan. 26, 2017 from http://www.captera.com/live-chat-software.

(Continued)

*Primary Examiner* — Solomon G Bezuayehu
(74) *Attorney, Agent, or Firm* — Robert H. Frantz

(57) ABSTRACT

A bridging for using a non-voice-based user interface, such as a text chat interface, with a voice-enabled interactive voice response system which, during a non-voice-based communication session with a client user device, receives from the client user device, a non-voice entry entered by a client user into the communication session; identifies one or more elements in the non-voice entry constrained by one or more allowed responses by the voice-enabled interactive voice response system; maps the one or more elements to one or more of the allowed responses; and passes the mapped one or more identified elements to a voice-enabled interactive voice response system as a input via emulation of a voice recognition analysis response.

20 Claims, 4 Drawing Sheets

(56) References Cited

U.S. PATENT DOCUMENTS

| | | | | |
|---|---|---|---|---|
| 2007/0271103 | A1* | 11/2007 | Natesan | H04M 3/4938 |
| | | | | 704/270.1 |
| 2008/0097748 | A1 | 4/2008 | Haley et al. | |
| 2009/0196405 | A1 | 8/2009 | Romeo | |
| 2012/0016678 | A1 | 1/2012 | Gruber et al. | |
| 2014/0222433 | A1 | 8/2014 | Govrin | |
| 2015/0010136 | A1* | 1/2015 | Lavian | H04M 3/493 |
| | | | | 379/88.11 |
| 2017/0169101 | A1* | 6/2017 | Walia | G06Q 30/016 |

OTHER PUBLICATIONS

Microsoft Developer; "VoiceXML Tutorial", retrieved on Jan. 26, 2017 from https://msdn.microsoft.com/en-us/library.

Microsoft Developer; "Lesson 3—Using Menus Instead of Forms", retrieved on Jan. 26, 2017 from https://msdn.microsoft.com/en-us/library.

Microsoft Developer; "Lesson 5—Alternatives to Inline Grammars", retrieved on Jan. 26, 2017 from https://msdn.microsoft.com/en-us/library.

Microsoft Developer; "Lesson 9—Text and Audio in Prompts", retrieved on Jan. 26, 2017 from https://msdn.microsoft.com/en-us/library.

Microsoft Developer; "Lesson 10—Mixed Initiative Forms", retrieved on Jan. 26, 2017 from https://msdn.microsoft.com/en-us/library.

Microsoft Developer; "Appendix B—Processing Grammar Returns", retrieved on Jan. 26, 2017 from https://msdn.microsoft.com/en-us/library.

Rodriguez, Jesus; "These Five Platforms Will Make Your Bots Language-Intelligent", retrieved on Jan. 26, 2017 from https://chatbotsmagazine.com/these-five-platforms-will-make-your-bots-language-intelligent.

W3C; "Semantic Interpretation for Speech Recognition (SISR) Version 1.0", retrieved on Jan. 27, 2017 from https://www.w3.org/TR/semantic-interpretation.

W3C; "Speech Recognition Grammar Specification Version 1.0", retrieved on Jan. 27, 2017 from https://www.w3.org/TR/2003.

W3C; "Voice Extensible Markup Language (VoiceXML) Version 2.0", retrieved on Jan. 26, 2017 from https://www.w3.org/TR/voicexml20.

Coyle, Frank; InformIT Pearson Education Publishing online, "Introduction to Voice XML Part 3: Voice XML Grammars", retrieved on Feb. 19, 2019 from http://www.informit.com/articles/article.aspx?p=784760, related to text book "Voice Application Development with VoiceXML" by Rick Beasley, Kenneth Michael Farley, John O'Reilly, Leon Squire, published by Que, ISBN-10: 0-7686-5792-X.

* cited by examiner

US 10,382,624 B2

BRIDGE FOR NON-VOICE COMMUNICATIONS USER INTERFACE TO VOICE-ENABLED INTERACTIVE VOICE RESPONSE SYSTEM

BACKGROUND

This invention relates generally to systems, methods and computer program products which enable pre-existing business logic of interactive voice response systems to be accessed, and used by a text-based chat interface, text messaging client, and other conversational user interfaces.

SUMMARY OF THE INVENTION

A system, method and computer program product are disclosed for bridging for using a non-voice-based user interface, such as a text chat interface, with a voice-enabled interactive voice response system which, during a non-voice-based communication session with a client user device, receives from the client user device, a non-voice entry entered by a client user into the communication session; identifies one or more elements in the non-voice entry constrained by one or more allowed responses by the voice-enabled interactive voice response system; maps the one or more elements to one or more of the allowed responses; and passes the mapped one or more identified elements to a voice-enabled interactive voice response system as a input via emulation of a voice recognition analysis response.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF EMBODIMENT(S) OF THE INVENTION

Problems Recognized

Figure 2A:
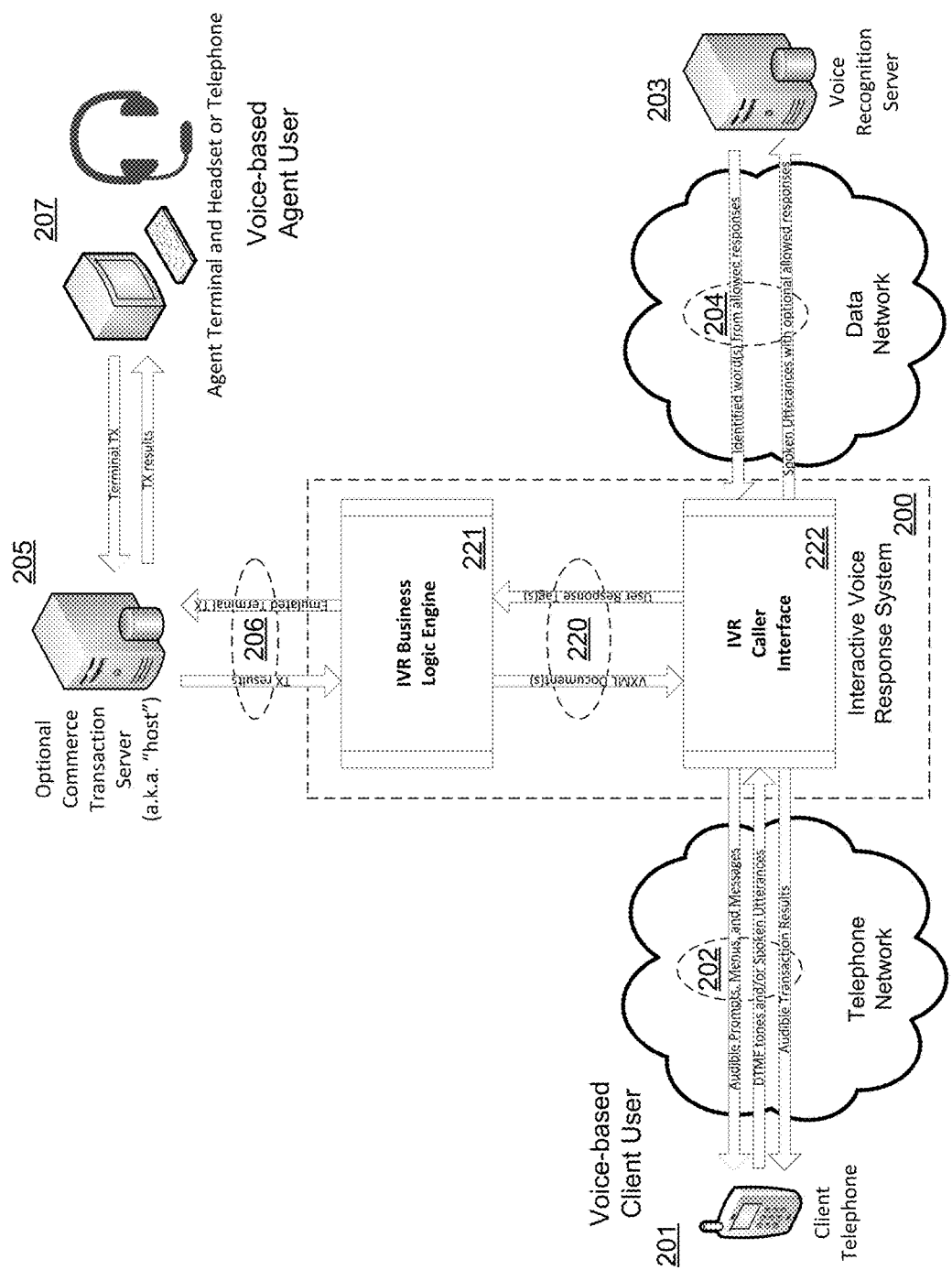
FIGS. 2A and 2B illustrate, in a generalized manner, arrangements of components for two typically distinct and separate systems: a first arrangement (FIG. 2B) that provides voice-based automated customer service, and a second arrangement (FIG. 2B) that provides text-based access to automated customer service.
Figure 2B:
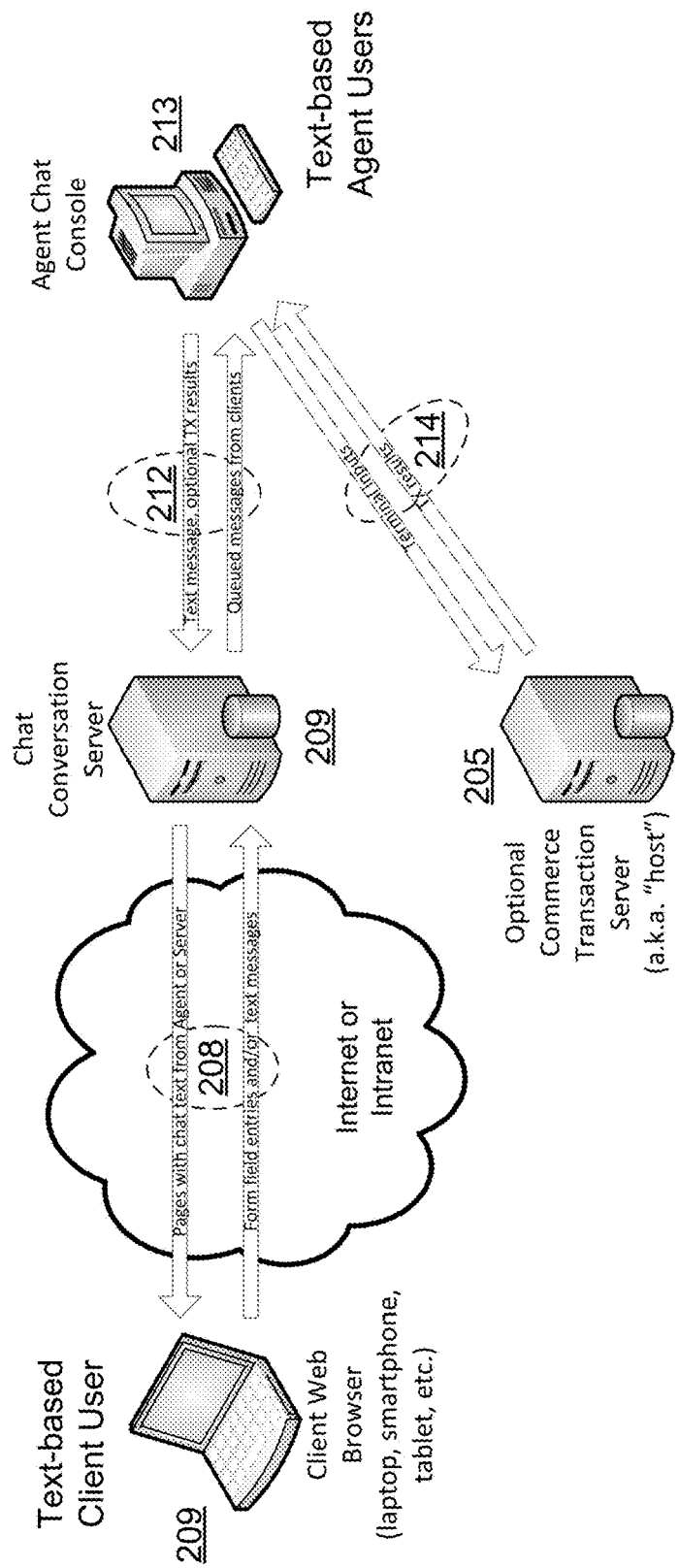

The present inventor(s) have recognized there is a considerable amount of duplication in two common systems today. Referring to FIGS. 2A and 2B, there are two separate and typically distinct systems shown which attempt to assist client users in obtaining information, both of which attempt to do so automatically, but provide ultimately for a human agent to assist the client user if the automation is unable to fulfill the client user's needs.

The first system, as shown in FIG. 2A, is an arrangement of computer-based components and networks around an Interactive Voice Response (IVR) system (200), which allows a client user to use a telephone (201) to communicate (202) via a telephone network with the IVR (200) to obtain some needed or desired information, such as bank account balances, or to conduct a transaction, such as a stock trade, via a commerce transaction server (205). The early designs of the user interface and protocol (202) with IVR systems required the user to respond to audible prompts using Dual Tone Multi-Frequency (DTMF) keys, and in response, the IVR system would generate an emulated terminal transaction with a commerce transaction server or "host" computer (205). The host (205) would return some information, such as an account balance or stock trade confirmation, in digital form to the IVR. The IVR would then create an audible message containing that resultant information, playing it to the client user on their telephone (201) via the telephone network. For the purposes of this disclosure, we will refer to the series of communications between the IVR and the client telephone in this configuration as a Phone-to-IVR protocol (202), and the series of communications between the IVR and the host computer (205) as a host terminal protocol (206).

IVR systems available today support a wide array of host terminal protocols (206), some of which are proprietary to certain host implementations. And, most IVR systems available today support both analog telephone and digital telephone interfaces to the telephone network, although the communication to the user is still generally in the audible band (e.g., voice, music, tones, etc.).

As technology for voice recognition improved from the earliest designs of IVR, the possibility of supplementing the DTMF user input with user-spoken words in the phone-to-IVR protocol (202) became realistic. Generally speaking, without respect to IVR systems, speaker-dependent voice recognition using Natural Language Processing (NLP) allows for free form input via speaking, with little or no constraints being apparent to the person who is speaking. Speaker-dependent NLP voice recognition is most accurate when "trained" to recognize the voice of a single user, typically by having the user first read a selection of pre-determined texts so that the system can build certain coefficients to adapt to the user's particular voice, dialect, and diction. However, speaker-dependent voice recognition was found to be impractical for use with IVR systems because it is inconvenient to have every customer of a bank or stock brokerage to commit considerable time train the system through such a process. Further, the quality of the audio connection between the user's telephone microphone, through the telephone network, and to the IVR system may vary considerably from one call to another, also making speaker-dependent voice recognition inappropriate for IVR usage.

Voice-based IVR input became practical with the advent of limited expected utterance inputs associated with each menu or prompt provided to the caller. For example, a menu or prompt may allow only a user to speak a yes or no answer, or some limited variations thereof (e.g., yeah, nope, OK, etc.). So, it was recognizes that speaker-independent voice recognition is not actually required for IVR applications, only the ability to differentiate between a limited number of spoken synonyms of the acceptable and expected inputs (e.g., versions of yes and versions of no) for any particular menu or prompt. Other menus may expect and limit the user's range of allowed inputs to other types and values, such as postal routing codes or social security numbers, which can then be used to limit the number of input options the voice recognition system must identify. Such natural language processing systems that are generally speaker-independent with limited expected and allowed input values is referred to as Natural Language Understanding (NLU), a subset of NLP in which the expected user inputs are reasonably constrained. NLU and Directed Dialog are two methods which both have limited expected values and are speaker-independent.

Still referring to FIG. 2A, modern IVR systems are often provided with voice recognition capabilities, such as access to a voice recognition server (203) that provides NLU functionality to the IVR, either natively, locally, or remotely via a data network (as shown). With voice-enabled IVR, the phone-to-IVR protocol (202) is enhanced to allow the user to speak their input in response to menus and prompts, rather than or in addition to using DTMF tones. This is more convenient for the client user, and also more compatible with a wider range of telephones which may or may not have the same markings on their DTMF keypads for alphabetic characters.

In this voice-enabled IVR arrangement, in response to each prompt or menu played to the client user on the client user's telephone, the client user speaks an appropriate, allowed and expected response, such as yes, no, or a string of digits that conforms to-an expected syntax (postal routing code, account number, card number, birth date, selecting an ordinal number from a list, etc.). This spoken response is referred to as an "utterance" for the purposes of this disclosure. The utterance is captured as a short digital voice recording, and it is transferred using an IVR-to-NLU protocol (204) from the IVR (200) to a voice recognition server (203), typically with some sort of indication or association of a set of allowed and expected responses (e.g., yes/no, social security number, etc.). In some IVR embodiments, both user-input DTMF tones and spoken utterance responses are allowed simultaneously, e.g. in response to a prompt such as "Please press or say your Social Security Number".

The voice recognition server (203) receives (204) the digitized utterance and the indication of expected and allowed input values, performs an voice recognition function to score the highest likelihood of the utterance matching one of the allowed values or completing an expected set of values, including a variety of synonyms for each allowed value. Most voice recognition servers also allow for determination that the utterance does not likely match any of the allowed values or does not complete the expected syntax of the input. The best match value, or the error of no match, is then returned (204) to the IVR (200) and used in the logical process (a "script" or "application") to determine what the next action should be.

Through a series of actions, prompts, menus, and other calculations, the IVR executes an IVR script or application to create a transaction with the commerce transaction server (205), which it conducts via the terminal emulation protocol (206). When the IVR receives (206) the results from the host (205), it may prompt (202) the user for additional information, or provide (202) the results in an audible form converted from the digital transaction (TX) results. The IVR business logic (i.e., script or application) (221) continues until the client user has completed his or her desired activity, or until it is determined that the IVR is not capable of completing the client user's activity, at which time most systems provide for transferring the telephone call from the IVR to an agent user's telephone, headset, and terminal (207). Often, a Private Branch Exchange (PBX) (not shown) and an automatic call distributor (ACD) (not shown) are also including in the arrangement of components to make the telephone call transfer to the agent's equipment so that the IVR may free up the port to receive and handle another telephone call.

As such, FIG. 2A illustrates the first of two typically distinct customer service automation systems in general, including the IVR (200), the telephone network, a client user's telephone (201), and some sort of voice recognition facilities (203), with optional host(s) computer(s) (205) and live agent equipment (207). The NLU functions may be native to the IVR, locally networked to the IVR, remotely networked to the IVR, or some combination thereof. The phone-to-IVR protocol (202) is well-known, and the IVR-to-Voice_Recognition protocol (204) includes a variety of proprietary protocols as well as a plurality of open or public protocols that facilitate the integration of IVR systems and NLU systems from different suppliers and developers. The host computers are well known in the art, as are their various terminal protocols (206), including some proprietary and several open standard protocols. Further details of the internal functionality (220, 221, 22) of modern IVR systems will be discussed in more detail in the following paragraphs.

The second system customer service automation system is depicted in FIG. 2B, which provides an arrangement of components to allow client users to "chat" using text-based communications instead of voice-based communications as in FIG. 2A. There are several text-based communications session paradigms for which current systems, and improved systems according to the present invention, may implement. One such text-based communications paradigm is the "web chat" paradigm in which a user encounters a web page which allows the user to "chat" with a live or robotic chat agent, typically within a pop-up dialog box. This chat, however, is conducted using text entries into the dialog box. Another text-based communication paradigm is a session of text messages, such as emails, Short Messaging Service (SMS) messages, "tweets", or in-application text communications, in which the user and an agent communicate with each other through a conversation of text messages back and forth which are associated together as a conversation (e.g., a session). For the purposes of this disclosure, we will collectively refer to these and other text-based communication protocols as a web chat (208). The present invention is equally useful and applicable to user interfaces which use synchronous text-based communications (e.g., chat in a pop-up dialog on a web page) as well as asynchronous text-based communications (e.g., hold a conversation over a period of time using text messages using a smart phone). For the purposes of this disclosure, text-based communications between a client-user's device (209), such as a web browser, laptop computer, smart phone, tablet computer, etc. and a live agent using a web browser computer (209) is generally over an internet or intranet connection using one or more of well-known communication protocols (208), such as hyper-text transfer protocol (HTTP), short-messaging service (SMS), etc. A number of software and protocols are well-known in the art to manage and group (bind) a set of messages into a web chat conversation or a communication session, such as but not limited to Internet Relay Chat (IRC). It will be readily understood by those ordinarily skilled in the art that the various embodiments and benefits of the present invention may be realized using any of the widely available web chat protocols.

For example, when a client user is "visiting" a web page using their web browser (209), many companies and entities which operate web sites will also provide an option in a pop-up window on their web pages to "chat" with a live agent. Again, by "chat", we are referring inclusively to any text-based series of communicated messages which are written in an unstructured, natural language (NL), exchanged between the client user and the live agent as a conversation or session. In this form of text-based customer contact communications, for example, the client user engages a "chat" option on a web page which his or her computer has received (208) from a web server computer. A chat server (209) typically provides a greeting by a first text message, such as "Hi, I am Roy, how can I help you today?" The client user can then type an unstructured answer into a field in the "chat box", such as "I need to check my account balance" or "make a stock trade, please". This input text message in an unstructured format is then routed (212) to an agent's chat console computer (213), where the agent user reads it, and determines how to proceed. If the agent needs more information, he or she may type a second text message, also in unstructured format, which is sent (212) from the agent chat console through chat server (208) to (208) the client user's web browser, where it is display to the client user. Again, the client user may type a text-based unstructured answer into the chat box, and that second response is forwarded (208, 209, 212) to the agent chat console (213). This back-and-forth process continues until the agent has gathered enough information to provide the needed information to the client user or to conduct a transaction (214) with an optional commerce transaction server (205) on behalf of the client user.

In this text-based configuration of components of FIG. 2B, a visitor at a web page (or user of a text messaging smart phone) is able to engage a live agent via a conversation using non-voice entries to the conversation, such as text-based unstructured messages. The series of messages back and forth may be associated into a session (or conversation) by a chat application or plug-in in the client user's web browser, or they may be transmitted separately but associated into a session via another text-based messaging system, such as Short Message System (SMS), electronic mail, etc.

The chat-only systems of current technology are often implemented with a so-called "chat" bot in which an automated system attempts to determine what the user is inquiring about using some sort of Artificial Intelligence (AI) processing. The chat-only system may determine if more information is needed from the user, and request it if needed, eventually retrieving and transmitting text-based results including the user-sought information or performing a necessary transaction on behalf of the user. These sorts of chat bot systems are often used in Frequently Asked Question ("FAQ") types of applications where the system tries to retrieve and display appropriate FAQ Answers based on the input from the user.

The foregoing descriptions of available voice-based (IVR) customer service automation systems and separate text-based (chat) customer service automation systems are provided for general understanding of the present reader, and are not intended to be an in-depth technical review or opinion of any these particular systems or to limit the scope of the present invention.

The present inventors have realized that the web chat, conversation and session paradigms provide for more natural, conversation like interaction between the user and the agent, avoiding traversing multiple layers of menus typical of the structured (synchronous) paradigm provided to the client user by an IVR. However, most owners of IVR systems already have substantial investment in the development, deployment, testing, and refinement of their IVR scripts and applications, which must be duplicated and separately maintained by training of the chat agent or programming of an automated or semi-automated chat server.

Thus, the inventor has realized that a considerable amount of duplicate computing hardware, energy, communications bandwidth, and maintenance functions can be eliminated by an invention which bridges the asynchronous chat-like user interface paradigm to the synchronous structured interface of a voice-enabled IVR, thereby allowing the owner and operators of such improved computer-based technology to leverage and re-use the scripts and applications of the IVR. Further, maintenance, revisions, and additions to the IVR script and applications must only be performed once on the IVR, and do not have to be performed again on a separate chat-dedicated constellation of components and systems.

Figure 1:
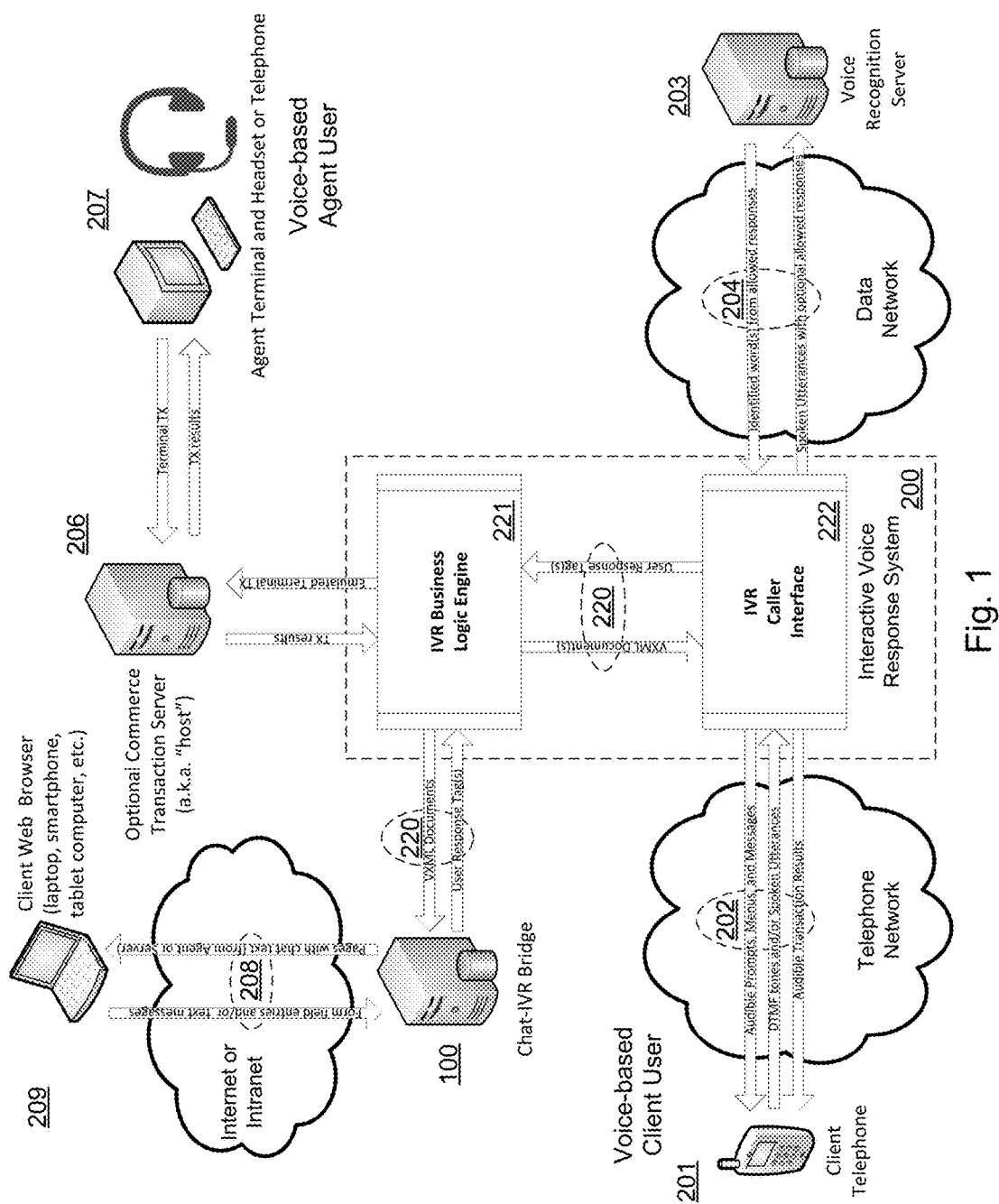
FIG. 1 depicts an arrangement of multiple computer-based systems and components according to improvements provided by at least one embodiment of the invention.

Referring now to FIG. 1, a general arrangement of networks, terminals, and computer-based components is shown according to at least one embodiment of the present invention to provide the aforementioned improvements to multiple types of computing technology. In this arrangement, the existing IVR (200) is interfaced to a new Chat-IVR bridge (100) to interface a text-based client user device (209) (e.g., chat, SMS, etc.) to an IVR (200) such that the business logic (221) can be leveraged and re-used, preferably in a manner which requires little or no change to the IVR itself. First, the text-based communication protocol (208) is emulated between the new Bridge (100) and the client-user device (209). Second, the Bridge can interface to the IVR using the same protocol (204) as the NLU voice recognition server, or in a particular embodiment, it emulates a standardized protocol (220) which will be described in further detail in the following paragraphs. In this general arrangement, an embodiment of the invention may be realized as an improvement and enhancement to any speech-enabled IVR system to provide chat and/or asynchronous text-based messaging with a client user, thereby re-using the existing IVR business logic (i.e. script, application) and reducing or eliminating the need for the separate chat-to-agent system. The emulated protocols (208, 204, 220) may be compliant with proprietary protocols, such as one may find in "closed" architectures of speech-enabled IVR, or the emulated protocols may be compliant with "open" protocols, or combinations thereof.

Continuing to refer to FIG. 1, the new Chat-IVR bridge (100) also interfaces to a client user's web browser, either directly or indirectly, using similar or the same web browser functions, helpers and plug-ins as the chat-only arrangements, in order to enhance backwards compatibility and reduce complexity of implementation. In this manner, the user experience may proceed unchanged from the chat-only systems, albeit the client user will be engaging the services of an IVR instead of a chat bot. For example, the general flow steps and information of the new arrangement of components may begin with the client user instructing the web browser (209) to "go to" a web page, which actually triggers a web page request, such a Hyper Text Transfer Protocol (HTTP) request. An HTML page is sent (208) from the Bridge (100) to the web browser (209) which includes in it or linked to it a "live chat" dialog box, pop-up, menu, bar, or other suitable user interface function.

The Chat-IVR bridge (100) also requests (220) from the IVR (200) an initial prompt, greeting or menu according to the business logic of the IVR, and the Bridge (100) converts it to a text greeting, introduction, initial prompt, etc. to be sent (208) to and shown in the chat box on the web browser (209). In some embodiments, the Chat-IVR Bridge (100) may be supplied with its own initial greeting, menu, or prompt to begin the conversation with client user. For example, in a health insurance business enterprise system, the IVR audible prompt "Welcome to First United Health Services" may be converted to a first text posting in the chat.

The client user would then be able to enter text in an unstructured or structured format into the chat box on the web browser (209) to indicate his or her need or reason for making contact with the system or an agent. For example, the client user might enter into the chat box the text (not an utterance), "What is my eligibility for a root canal?"

The Chat-IVR Bridge (100) receives (208) this text input from the client web browser (209), but instead of forwarding it directly to the IVR, the Bridge (100 processes the text according to a list of allowable and/or expected inputs for this menu or prompt, using text-based NLU. The NLU may be native to the Bridge (100), or the NLU may be obtained as a service from another computer-based system, which is described in further detail in subsequent paragraphs.

Following the completion of the NLU analysis, the Bridge (100) creates a "user response" to the IVR (200) identifying the words (or phrase) from the allowed and expected inputs, which the IVR receives (204 or 220) and uses to advance the business logic (221) of the IVR. This leads to more menus and prompts being converted to text messages, posted in the chat (208), and to client user unstructured text inputs being received (208), analyzed and converted to NLU input indications, until the IVR has completed a transaction with the host (205) or otherwise completed the client user's needed service.

In this manner, pre-existing IVR business logic (221) and the equipment on which it is executed is leveraged to provide text-based customer services to a client user. The text-based communication protocol can be substituted or amended to include other text-based messaging paradigms and schema, such as "text messaging" (SMS) and electronic mail ("eMail"). And, other embodiments of IVR systems may incorporate the Bridge's (100) functionality directly into the IVR system such that it appears to be native to the IVR, with such embodiments still being within the scope of the present invention.

A particular embodiment of the present invention leverages several different open standards for component interfaces in order to realize a system which can be utilized with a wide variety of IVR systems from many vendors. The functionality may be integrated in a manner that makes the embodiment appear to be native to an IVR, or may be offered as a separate product which is compatible with existing IVR systems. Those skilled in the art will recognize that variations of this embodiment, as well as other variations that use closed architectures and/or proprietary interfaces and protocols fall within the scope of the present invention.

VXML (Voice eXtensible Markup Language) is an open standard in the IVR industry which allows compatibility with and interactivity for speech-enabled IVR systems promulgated and maintained by the World Wide Web Consortium (W3C). VXML is well-known in the industry, and version 2.0 of the VoiceXML (VXML) standard is publicly available. In VXML parlance, a "grammar" is the list of expected and allowable inputs from a user who is making inputs via spoken utterances, and a "VXML document" (a.k.a. VXML page) is unit of information logically analogous to a hyper-text markup language (HTML) or eXtensible markup language (XML) "page" in web page server parlance.

Referring for the moment to the details shown within the IVR (200) of FIG. 1 and FIG. 2A, a generalized partitioning of functionality for VXML-compliant speech-enabled IVR systems is shown in which a caller interface (222) is responsible for creating audible prompts and decoding audible inputs from the user's telephone (201). According to the VXML specifications, a protocol (220) is established for the caller interface portion (222) to interoperate with a business logic engine (221), which includes the engine supplying (220) the next VXML document (i.e. the next prompt or menu) to the caller interface, and the caller interface providing the user responses in the form of "tags" (220) back to the business engine (221).

Also according to the VXML specifications, the caller interface (222) may implement voice user input by interfacing (204) to an NLU server, A VXML-compliant grammar is provided to the NLU speech recognizer, typically along with the digitized voice audio representing the utterance. The speech recognizer then scores the utterance for the best match within the allowed inputs (e.g., within the "grammar"), and returns that selected value to the caller interface (222), which then forwards that as a user response tag to the business logic engine (221) of the IVR. The VXML specifications relevant to speech-enabled IVR set forth this protocol, including its extensions and exceptions.

However, in the case of embodiments of the present invention, such as the embodiment shown in FIG. 1, there is no spoken utterance from the client user to process because the client user is using a text-based device (209). Instead of the usual voice- and DTMF-based IVR, in the inventive embodiment, there is the opportunity to process the unstructured text chat entries from the client user using the same IVR business logic that can be used to process voice and DTMF input from callers. For the purposes of the present disclosure, the term "grammar" will be used to represent the list of acceptable user inputs to be identified from a received text message, not from a received digitized voice utterance.

Thus, a standard VXML grammar is a form of input to a speech recognizer. The full protocol and interface between IVR and speech recognition systems is described in W3C's Speech Recognition Grammar Specification (SRGS). Embodiments of the present invention adapt and extend the definition of "grammar" to particular relevance to handling of natural language text message, such as chat, SMS or email messages, while maintaining the scope of words that may be typed (not spoken), patterns in which those words may occur (number formats, phrase formats, etc.), and the language (English, Spanish, etc.) expected of the words and phrases.

By adopting and improving this open and widely-used protocol scheme, embodiments of the present invention can emulate this half of the protocol, and particularly the SRGS protocol, between an IVR and a speech recognizer under the VXML specification, thereby providing chat message processing integrated to an unchanged, pre-existing IVR. Methods for interpreting and extracting the results of the recognition using a programming language, such as JavaScript, are described in Appendix B—Processing Grammar Returns of the W3C VXML specification. For this reason, embodiments of the present invention can emulate the "grammar returns" of a known speech recognition system, or can even implement their own "grammar returns" which can then be easily interpreted by the IVR through addition of corresponding-executable processor code, such as JavaScript™ or a similar programming language.

In VXML parlance, a document (sometimes referred to as a "page") is not actually an HTML page (e.g., web page), but instead it is the next client user input opportunity (e.g., greeting, prompt, menu, form, etc.) or output to the client user (e.g., host transaction results, etc.). A VXML-compliant IVR determines which VXML document to send to the client user next based upon the business logical (e.g., script or application) being executed by the IVR. So, in many ways, a VXML-based IVR appears to operate similarly to a web server, but in other ways, it remains quite different.

It should also be noted that the W3C VXML specification recommends that all VXML documents which include audible prompts also include a text string representing what is heard in the audible prompts. The audible prompts are embedded in the VXML document as digitized audio, but not all IVR systems may be able to playback (e.g., convert the digital data to audio waveforms) the digitized audio due to a vocoding format incompatibility. So, it is the recommendation of the W3C VXML specification that corresponding text be included in the VXML document in order to allow an IVR to employ text-to-speech functions to create an audible message directly from the text representation of the prompt. While this W3C recommendation is intended by W3C to make VXML documents cross-compatible with a wide range of IVR systems, it also provides the hook with which embodiments of the present invention may create a text message to present to a chat client since chat clients generally do not play back audio.

In some embodiments, the bridge may include a mapping, such as through a database or configuration table, from the digital audio prompt name (e.g., FS1001.wav) to the text that you would like to display (e.g, "Please say your date of birth"). Such a mapping resource will allow this embodiment to operate when the text is not sent in the VXML document, especially for older systems which may not be fully VXML compliant and for pseudo-proprietary systems. Further, such a mapping can provide a thesaurus-like function, allowing the bridge system to recognize slightly modified wording of phrases. For example, the prompt "Please Say your Date of Birth" may be mapped to alternatively acceptable phrases, such as "Please tell me your date of birth".

As such, an embodiment of the present invention shown in FIG. 1 interfaces to the IVR using the same (or similar) protocol (220) as traditionally used between the business logic engine (221) and the caller interface (222) functions of the IVR. In this manner, the business logic engine (221) is reused with little or no required changes, thereby improving the IVR's scope of application to include text-based user devices while minimizing the cost of equipment and changes.

Figure 3:
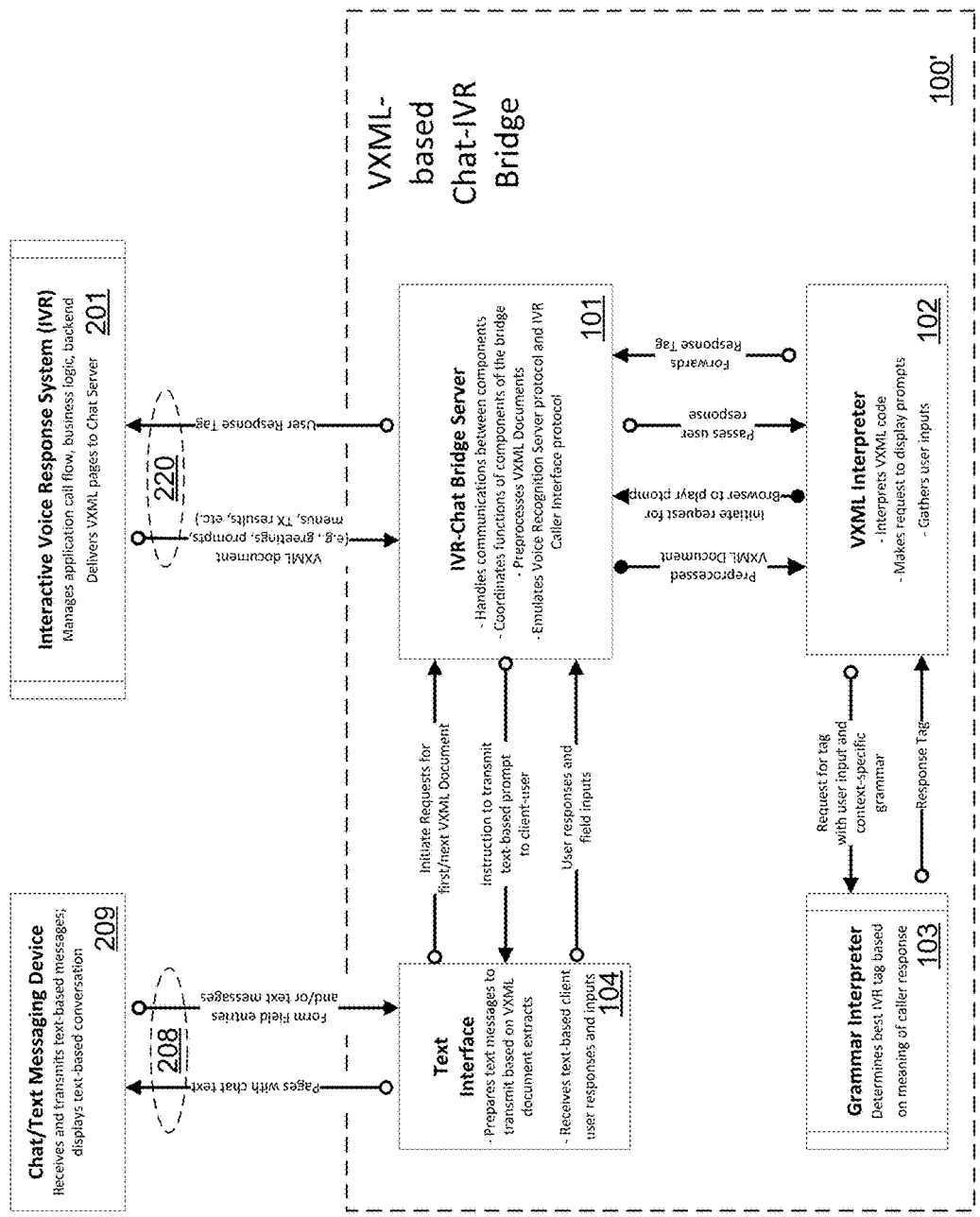
FIG. 3 shows more details of at least one embodiment according to the present invention of a particular VXML-based implementation and realization of an improvement to at least two different computer technologies shown in FIG. 2 with the improved arrangement of FIG. 1.

The VXML-based embodiment (100') of a Chat-IVR Bridge (100) shown in FIG. 3 utilizes the inventive new and extended definition of "grammars" to process the received unstructured text from the chat web browser (209) as IVR inputs. In this example embodiment, a chat server (101) handles the communications between the other components of the bridge. When a new session with a chat client starts, the IVR-Chat Bridge Server (101) will request an initial VXML document from the IVR, such as a greeting or first menu, which will be converted by the Text Interface (104) into a format that can be transmitted (208) to the client user's device (209) for display, such as to a web browser to be shown as an entry in a chat conversation. In other embodiments, the IVR-Chat Bridge Server (101) may receive an initial natural language text message from the client web browser (209), which can be processed to jump start the IVR business logic at a point other than the initial menu or greeting.

When the IVR-Chat Bridge Server (101) receives an unstructured text string from the client user's device (209) via the Text Interface (104), the IVR-Chat Bridge Server (101) preprocesses the VXML document which prompted the user input to extract a "grammar" (e.g., the list of expected and allowed inputs and their formats), and combines that with the user input text message to form a request to the Grammar Interpreter (103).

The Grammar Interpreter (103) receives the user input unstructured text, and performs NLU functions on it using the supplied grammar, and scores the words and phrases within the user input text allowed in the grammar. The Grammar Interpreter (103) then returns a Response Tag to the VXML interpreter (102), which forwards (220) the Response Tag to the IVR-Chat Bridge Server (101). It should be noted that the grammar used by the Grammar Interpreter (103) may be supplied using a VXML-compliant grammar (and protocol), or it may be a proprietary grammar stored by the bridge system, or some combination or both.

As previously stated, in at least one embodiment, the IVR-Chat Bridge Server (101) provides the Response Tag (220) to the IVR in a protocol and format which is backwards-compatible with existing IVR's expected response from an utterance-driven Speech Recognition system, except that the ultimate input was gleaned the client user's text input in a text-based communication session.

The IVR business logic engine (201) then considers that User Response Tag as if it were a recognized speech input, and delivers to the IVR-Chat Bridge Server (101) the next VXML document according to the business logic of the IVR, wherein the next VXML document may be another menu, prompt, announcement, or the result of a host transaction that the IVR may have performed on behalf of the client user.

This next VXML document is, as previously described, processed by the IVR-Chat Bridge Server (101) and the Text Interface (104) to prepare it for textual presentation on the client users device (209), such as in a chat box or chat dialog pop-up window. This cycle of document-by-document processing continues until the client user's needs are completed or until the business logic of the IVR determines that the session with the client user should be directed to an alternative destination, such as a live chat agent.

It should be noted that the grammars used in embodiments such as the one shown in FIG. 3 can be transmitted to the grammar interpreter (103) with the NL text string to be processed, or the grammars may be native to the interpreter, stored remotely, or handled in all the analogous variations that the VXML specification outlines. And, as stated in the foregoing paragraphs, it should be noted again that the chat session may be replaced with or extended to include other asynchronous messaging paradigms, such as text messaging (SMS), text-based mobile App, eMail, and combinations thereof.

In some embodiments, advanced session tracking may be implemented by the bridge (100 or 100') in order to allow greater time gaps between successive correspondences between the client user and the IVR, with appropriate security measures to prevent unauthorized users from taking over an in-progress session.

Enhanced embodiments of the present invention may include artificial intelligence (AI) and machine learning-based components which will grow and refine a mapped sets of alternative acceptable and expected inputs, either fully automatically or under guidance by an administrator. In such an enhanced embodiment, an initial set of expected input values and allowed alternatives (e.g., synonyms) can be augmented, revised and extended as the system is operated with real user input.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process or processes.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for bridging a non-voice-based user interface to a voice-enabled interactive voice response system comprising:
    during a communication session with a client user device, receiving, by a computer, from the client user device, an entry representing a response by a client user into the communication session;
    identifying, by a computer, using one or more Natural Language Understanding processes, one or more non-uttered non-DTMF elements in at least a portion of the entry, wherein the identifying is constrained by one or more voice markup grammars according to a voice recognition analysis protocol for a voice-enabled interactive voice response system;
    mapping, by a computer, the one or more identified non-uttered non-DTMF elements to generate one or more of the voice markup grammar returns from the non-uttered non-DTMF elements; and
    passing, by a computer, the generated voice-markup grammar returns to an interactive voice response system as a user input;
    thereby emulating the voice recognition analysis protocol upon non-uttered non-DTMF input and without utterance-driven speech recognition.

2. The method as set forth in claim 1 wherein the entry comprises a text entry.

3. The method as set forth in claim 1 further comprising: subsequent to the passing of the mapped elements to the interactive voice response:
    receiving, by a computer, from the voice-enabled interactive voice response system a next greeting, prompt, form or menu;
    converting, by a computer, the next greeting, prompt, form or menu to a next text-based message; and
    entering, by a computer, the converted next text-based message into the text-based communication session with a client user device.

4. The method as set forth in claim 3 wherein the received next greeting, prompt, form or menu comprises a voice-enabled extensible markup language document.

5. The method as set forth in claim 4 wherein the converting comprises extracting a text string from the voice-enabled extensible markup language document representing a text alternative to a digital voice recording in the voice-enabled extensible markup language document.

6. The method as set forth in claim 1 further comprising:
    prior to the receiving of the entry from the client user device:
    receiving, by a computer, from a voice-enabled interactive voice response system an initial greeting, prompt, form or menu;
    converting, by a computer, the initial greeting, prompt, form or menu to an initial text-based message; and
    entering, by a computer, the converted initial text-based message into the text-based communication session with a client user device.

7. The method as set forth in claim 6 wherein the received initial greeting, prompt, form or menu comprises a voice-enabled extensible markup language document.

8. The method as set forth in claim 7 wherein the converting comprises extracting a text string from the voice-enabled extensible markup language document representing a text alternative to a digital voice recording in the voice-enabled extensible markup language document.

9. The method as set forth in claim 1 wherein the voice markup grammars comprise a voice-enabled extensible markup language (VMXL) grammar.

10. The method as set forth in claim 1 wherein the communication session is selected from a group consisting of a web chat session, a conversation of Short Message Service messages, a conversation of mobile computing platform application program messages, a conversation of electronic mail messages, and a conversation of social media messages.

11. A computer program product for bridging a non-voice-based user interface to a voice-enabled interactive voice response system comprising:
    a tangible, computer-readable memory device embodying program instructions for causing a processor to, when executed, perform steps of:
    during a communication session with a client user device, receiving from the client user device, an entry representing a response by a client user into the communication session;
    identifying, using one or more Natural Language Understanding processes, one or more non-uttered non-DTMF elements in at least a portion of the entry, wherein the identifying is constrained by one or more voice markup grammars according to a voice recognition analysis protocol for a voice-enabled interactive voice response system;
    mapping the one or more identified non-uttered non-DTMF elements to generate one or more of the voice markup grammar returns from the non-uttered non-DTMF elements; and passing the generated voice-markup grammar returns to an interactive voice response system as a user input;

thereby emulating the voice recognition analysis protocol upon non-uttered non-DTMF input and without utterance-driven speech recognition.

12. The computer program product as set forth in claim 11 wherein the received entry comprises a text entry.

13. The computer program product as set forth in claim 11 wherein the program instructions further comprise program instructions to:

prior to the receiving of the unstructured natural language non-voice entry from the client user device:
receive from a voice-enabled interactive voice response system an initial greeting, prompt, form or menu;
convert the initial greeting, prompt, form or menu to an initial text-based message; and
enter the converted initial text-based message into the text-based communication session with a client user device; and subsequent to the passing of the mapped elements to the interactive voice response:
receive from the voice-enabled interactive voice response system a next greeting, prompt, form or menu;
convert the next greeting, prompt, form or menu to a next text-based message; and
enter the converted next text-based message into the text-based communication session with a client user device.

14. The computer program product as set forth in claim 13 wherein the received greeting, prompt, form or menu comprises a voice-enabled extensible markup language document, wherein the allowed responses by the voice-enabled interactive voice response system comprises elements from a voice-enabled extensible markup language grammar.

15. The computer program product as set forth in claim 11 wherein the communication session is selected from a group consisting of a web chat session, a conversation of Short Message Service messages, a conversation of mobile computing platform application program messages, a conversation of electronic mail messages, and a conversation of social media messages.

16. A system for bridging a non-voice-based user interface to a voice-enabled interactive voice response system comprising:

a computer processor; and
a tangible, computer-readable memory device embodying program instructions for causing the processor to, when executed, perform steps of:
during a communication session with a client user device, receiving from the client user device, an entry representing a response by a client user into the communication session;

identifying, using one or more Natural Language Understanding processes, one or more non-uttered non-DTMF elements in at least a portion of the entry, wherein the identifying is constrained by one or more voice markup grammars according to a voice recognition analysis protocol for a voice-enabled interactive voice response system;

mapping the one or more identified non-uttered non-DTMF elements to generate one or more of the voice markup grammar returns from the non-uttered non-DTMF elements; and passing the generated voice-markup grammar returns to an interactive voice response system as a user input;

thereby emulating the voice recognition analysis protocol upon non-uttered non-DTMF input and without utterance-driven speech recognition.

17. The system as set forth in claim 16 wherein the received comprises a text entry.

18. The system as set forth in claim 16 wherein the program instructions further comprise program instructions to:

prior to the receiving of the unstructured natural language non-voice entry from the client user device:
receive from a voice-enabled interactive voice response system an initial greeting, prompt, form or menu;
convert the initial greeting, prompt, form or menu to an initial text-based message; and
enter the converted initial text-based message into the text-based communication session with a client user device; and subsequent to the passing of the mapped elements to the interactive voice response:
receive from the voice-enabled interactive voice response system a next greeting, prompt, form or menu;
convert the next greeting, prompt, form or menu to a next text-based message; and
enter the converted next text-based message into the text-based communication session with a client user device.

19. The system as set forth in claim 18 wherein the received greeting, prompt, form or menu comprises a voice-enabled extensible markup language document, wherein the allowed responses by the voice-enabled interactive voice response system comprises elements from a voice-enabled extensible markup language grammar.

20. The system as set forth in claim 16 wherein the communication session is selected from a group consisting of a web chat session, a conversation of Short Message Service messages, a conversation of mobile computing platform application program messages, a conversation of electronic mail messages, and a conversation of social media messages.

* * * * *